S. C. STOKES.
Improvement in Combined Knife-Sharpener and Glass-Cutter.
No. 132,219. Patented Oct. 15, 1872.
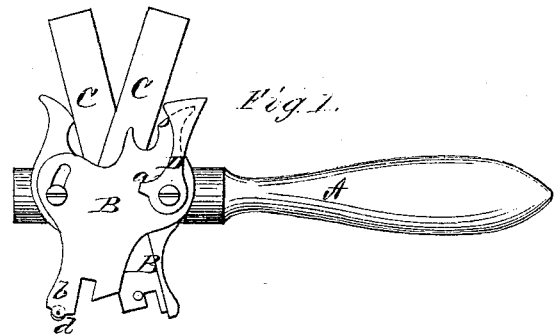
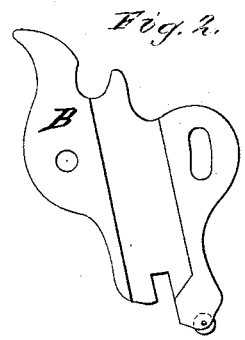

UNITED STATES PATENT OFFICE.

SEPTIMUS C. STOKES, OF MANCHESTER, NEW HAMPSHIRE.

IMPROVEMENT IN COMBINED KNIFE-SHARPENERS AND GLASS-CUTTERS.

Specification forming part of Letters Patent No. 132,219, dated October 15, 1872.

*To all whom it may concern:*

Be it known that I, S. C. STOKES, of Manchester, in the county of Hillsborough and State of New Hampshire, have invented certain new and useful Improvements in Combined Knife-Sharpener and Glass-Cutter; and I do hereby declare that the following is a full, clear, and exact description thereof, reference being had to the accompanying drawing and to the letters of reference marked thereon, which form a part of this specification.

The nature of my invention consists in a compound implement composed of a revolving roller for cutting glass attached to the knife-sharpener, for which Letters Patent were granted to me May 3d, 1870.

In order to enable others skilled in the art to which my invention appertains to make and use the same, I will now proceed to describe its construction and operation, referring to the annexed drawing, in which—

Figure 1 is a side view of my compound implement, and Fig. 2 is an inside view of one of the plates B.

A represents the handle, and B B the plates attached to the same, which plates have grooves on their adjoining surfaces for the reception of the sharpening-bars C C, and are held closely together by means of the lever D having the projection, all as fully shown and described in my patent for knife-sharpener above referred to. In this case I provide the lower end of the top plate B with a socket-like projection, $b$, in which is placed a revolving roller, $d$, suitable for cutting glass. The handle of my knife-sharpener gives sufficient leverage over the roller in using it to cut glass.

I am fully aware that a revolving roller for cutting glass is not new, and hence I do not claim such as my invention; but What I do claim as new, and desire to secure by Letters Patent, is—

As an improved article of manufacture, the implement described, having the plate B provided at its lower end with the socket-like projection $b$ and the roller $d$, the several parts being constructed and arranged substantially as and for the purpose set forth.

In testimony that I claim the foregoing as my own I affix my signature in presence of two witnesses.

SEPTIMUS C. STOKES.

Witnesses:
 CEPHAS BRIGHAM,
 J. B. RICHARDSON.